April 6, 1937. H. L. ADAMS 2,075,788
WING BROADENING EXTENSION
Filed Nov. 22, 1932
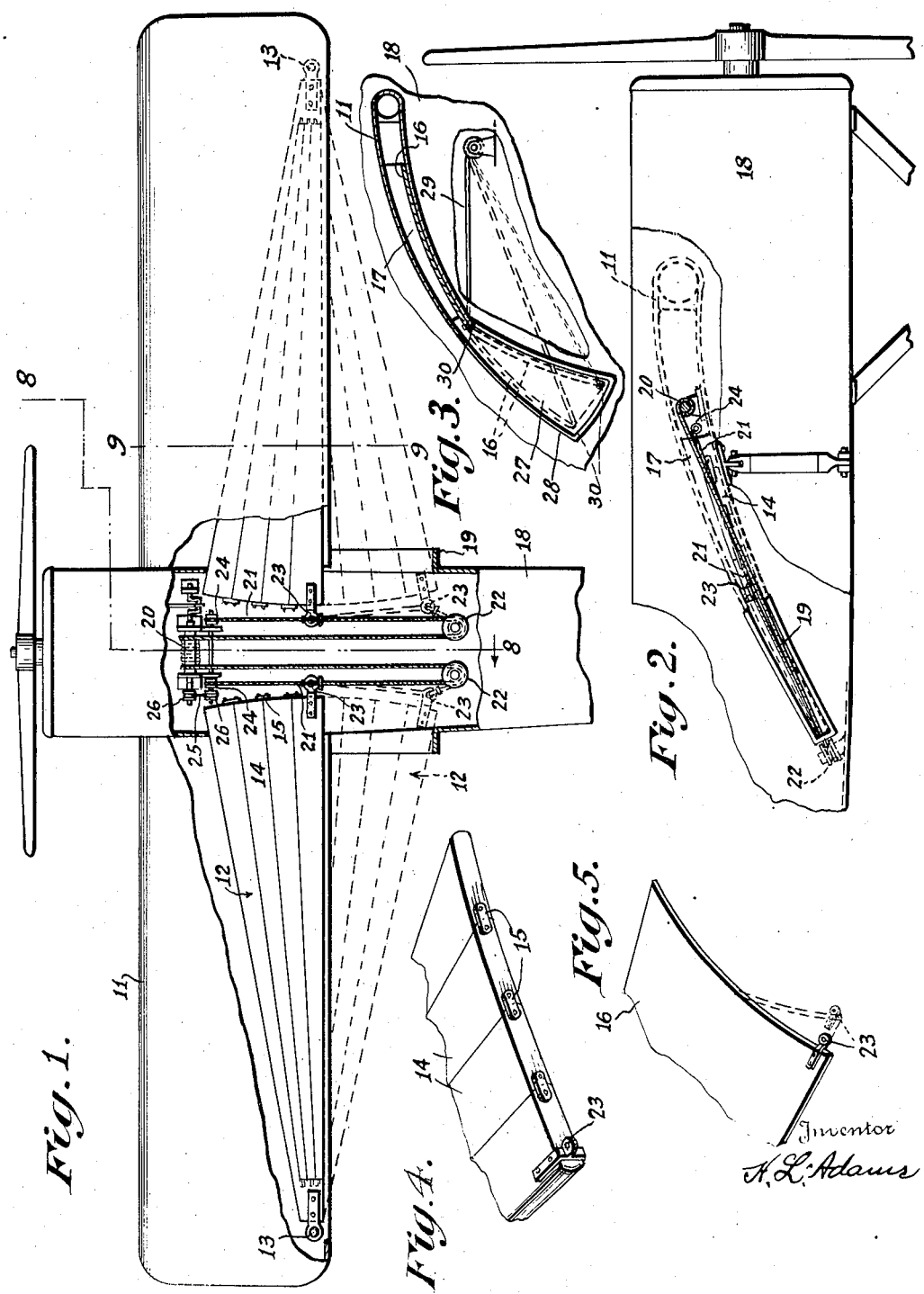
Inventor
H. L. Adams Patented Apr. 6, 1937

2,075,788

UNITED STATES PATENT OFFICE 2,075,788

WING BROADENING EXTENSION

Herbert Luther Adams, Washington, D. C.

Application November 22, 1932, Serial No. 644,558

5 Claims. (Cl. 244—43)

This invention relates to wing broadening extensions for flying machines, and the application is a continuation in part of my prior application Serial Number 461,412, filed April 14, 1921, and since maturing into Patent 1,888,418.

The primary object of the invention is to enable the operator of a flying machine to readily convert a high speed wing into a low speed wing to facilitate landing and taking off, particularly on and from restricted areas.

A further object of the invention is to enable the operator to accomplish the foregoing merely by varying the area of the wing, and in the event of further conversion being desirable, to accomplish the same by varying the resistance of the wing to forward motion of the flying machine.

A further object of the invention is to enable the operator to gain better and quicker control of a flying machine in the event of an emergency during ordinary flight.

The invention is illustrated in the accompanying drawing, in which:

Figure 1 is a top plan partly broken away of a flying machine embodying one form of the invention.

Figure 2 is a sectional elevation taken as indicated by the line 8—8 of Figure 1.

Figure 3 is a section through the wing as indicated at 9—9 but showing a modified form of wing extension and guide means therefor.

Figure 4 is a fragmentary perspective of a wing extension having flexible joints such as shown in Figures 1 and 2.

Figure 5 is a fragmentary perspective of a unitary flexible wing extension such as shown in Figure 3.

In the embodiment of the invention shown in Figure 1, each wing 11 is provided with a segmental shaped extension 12 telescopically received therein. The apex of the extension 12 is pivoted at 13 adjacent the outer and rear edges of the wing, and the rear edge of the extension normally lies adjacent the rear edge of the wing. Preferably the extension 12 is comprised of a series of sections 14 having their ends pivoted to connecting pieces 15 to provide flexible joints between the sections as more clearly shown in Figure 4, although the extension may consist of a single piece of relatively thin resilient material as indicated at 16 in Figure 5.

The extension 12 is slightly longer than the distance from the pivot 13 to the inner edge of the wing, and an inner end portion of the extension projects through a slot 17 in the side of the fuselage 18. The length of the slot 17 is substantially twice the maximum width of the extension, and the slot extends an equal distance both forwardly and rearwardly from the rear edge of the wing. Coextensive with that portion of the slot which extends rearwardly from the wing is a guide 19 which may be formed with or suitably secured to the fuselage 18 adjacent the edges of said rearwardly extending portion of the slot 17.

The extensions 12 for both wings 11 are adapted to be operated simultaneously, and for that purpose I have shown a rotatable element 20 such as a roller or drum having a pair of cables 21 secured thereto to wind thereon when the element 20 is rotated in one direction, and to unwind therefrom when the element 20 is rotated in the opposite direction. Each of the cables 21 controls one of the extensions 12, and extends rearwardly from the element 20 to a pulley 22 suitably mounted within the fuselage 18. From the pulley 22, the cable 21 extends forwardly for connection with a lug 23 projecting from the extension 12 to a rotatable element such as a pulley 24 adjacent the rotatable element 20. There are two of the pulleys 24, one for each cable 21, and they are adapted to rotate in the opposite direction to the direction of rotation of the element 20 in order that the cables 21 will wind on the pulleys 24 when unwinding from the element 20, and vice versa. The opposite directions of rotation of the pulleys 24 and roller 20 may be accomplished in any suitable manner such as by crossing an endless belt 25 operating on a pair of pulleys 26 secured to shafts for the pulleys 24 and roller 20 respectively.

The slots 17 in the sides of the fuselage 18 may extend rearwardly from the wings 11 substantially in aligned continuation of the wings as shown in Figure 2, or the rear portion 27 of the slot may increase in width in a rearward direction as shown in Figure 3, in order to permit warping of the extension 12 when extended. In this construction, the upper wall of the portion 27 of the slot extends substantially in aligned continuation of the upper wall of the wing. Whatever the shape of the rear portion of the slot, the guide should conform therewith. The rearwardly widening guide shown in Figure 3 is designated by the numeral 28. For the purpose of warping the extension when extended, a line 29 is secured thereto adjacent its rear and inner edges as shown in Figure 3. From its point of connection 30 with the extension, the line 29 extends downwardly and forwardly to a suitable control means therefor as indicated at 31. Extensions 12 in accordance with either of Figures 4 and 5 may be employed in connection with either form of the guides 19 and 28.

When it is desired to extend the extensions 12, the roller 20 is rotated in a manner to wind the cables 21 thereon, whereby the extensions are drawn rearwardly to the position shown in dotted lines in Figure 1, or to any desired position intermediate the full line and dotted line positions shown in Figure 1. When guides like that designated as 28 are employed, in connection with slots having rearwardly widening rear portions such as 27, the extensions 12 when extended or partially extended will normally be disposed adjacent the upper walls of the guides, and may be warped if desired by tightening the lines 29. When it is desired to retract the extensions, the pulleys 24 are rotated in a manner to wind the cables 21 thereon.

Having described my invention, what I claim as new, and desire to secure by Letters Patent, is:

1. In a flying machine comprising a fuselage and a laterally extending wing, a segmental shaped flexible extension telescopically received in said wing and pivoted at its apex near the outer and rear edges of the wing, said fuselage having its side formed with a slot having a length substantially twice the maximum width of said extension and extending substantially equal distances forwardly and rearwardly of the rear edge of the wing, said extension having an inner end portion extending through said slot, and means disposed within said fuselage and operatively connected with the inner end of said extension for sliding the latter lengthwise of said slot.

2. In a flying machine comprising a fuselage and a laterally extending wing, a segmental shaped flexible extension telescopically received in said wing and pivoted at its apex near the outer and rear edges of the wing, said fuselage having its side formed with a slot having a length substantially twice the maximum width of said extension and extending substantially equal distances forwardly and rearwardly of the rear edge of the wing, the portion of said slot extending rearwardly of the rear edge of the wing being of substantially greater width than the thickness of said extensions, said extension having an inner end portion extending through said slot, means disposed within the fuselage and operatively connected with the inner end of said extension for sliding the latter lengthwise of said slot, and means connected with said extension for moving it crosswise of said slot to warp the extension when extended into the rearward portion of said slot.

3. In a flying machine comprising a fuselage and a laterally extending wing, a segmental shaped flexible extension telescopically received in said wing and pivoted at its apex near the outer and rear edges of the wing, guide means carried by said fuselage and extending rearwardly from the rear edge of said wing, and means operatively connected with said extension for moving it lengthwise of said guide means.

4. In a flying machine comprising a fuselage and a laterally extending wing, a segmental shaped flexible extension telescopically received in said wing and pivoted at its apex near the outer and rear edges of the wing, guide means carried by said fuselage and extending rearwardly from the rear edge of said wing, said guide means being of substantially greater width than the thickness of said extension, means operatively connected with said extension for moving it lengthwise of said guide means, and means connected with said extension for moving it crosswise of said guide means to warp said extension.

5. In a flying machine comprising a fuselage and a laterally extending wing, a segmental shaped flexible extension telescopically received in said wing and pivoted at its apex near the outer and rear edges of the wing, said fuselage having its side formed with a slot having a length substantially twice the maximum width of said extension and extending substantially equal distances forwardly and rearwardly of the rear edge of the wing, said slot gradually increasing in width in a rearward direction from the rear edge of said wing and having its upper wall substantially in aligned continuation of the upper wall of said wing, guide means carried by said fuselage and being coextensive with the portion of said slot disposed rearwardly of said wing, means operatively connected with said extension for moving it lengthwise of said slot and guide means adjacent the upper walls thereof, and means connected with said extension for moving it crosswise of said slot and guide means to warp the extension.

HERBERT LUTHER ADAMS.